(12) United States Patent
Bhinge et al.

(10) Patent No.: US 10,821,567 B2
(45) Date of Patent: Nov. 3, 2020

(54) ACOUSTIC AND VIBRATION SENSING APPARATUS AND METHOD FOR MONITORING CUTTING TOOL OPERATION

(71) Applicant: THE REGENTS OF THE UNIVERSITY OF CALIFORNIA, Oakland, CA (US)

(72) Inventors: Raunak Bhinge, Berkeley, CA (US); Yung-Chih Chen, Fremont, CA (US); Jinsu Choi, Cupertino, CA (US); Jennifer Dai, Berkeley, CA (US); David Dornfeld, Berkeley, CA (US); Wojciech Musial, Berkeley, CA (US); Rhett Gentile, Santa Monica, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 222 days.

(21) Appl. No.: 15/973,253

(22) Filed: May 7, 2018

(65) Prior Publication Data
US 2018/0326550 A1    Nov. 15, 2018

Related U.S. Application Data

(63) Continuation of application No. PCT/US2016/059441, filed on Oct. 28, 2016.
(Continued)

(51) Int. Cl.
B23Q 17/09    (2006.01)
B23Q 3/06    (2006.01)

(52) U.S. Cl.
CPC ........... *B23Q 17/098* (2013.01); *B23Q 3/066* (2013.01); *B23Q 17/0971* (2013.01);
(Continued)

(58) Field of Classification Search
CPC .. G01M 7/08; G01N 3/20; G01N 3/30; B23Q 3/066; B23Q 17/0971; B23G 17/098; B23G 17/12
See application file for complete search history.

(56) References Cited

U.S. PATENT DOCUMENTS 3,809,488 A * 5/1974 Sonderegger ...... B23Q 17/0966
408/6
4,911,002 A    3/1990 Enderlin
(Continued)

FOREIGN PATENT DOCUMENTS

CN    204639977 U    9/2015
JP    07308847 A    11/1995
(Continued)

OTHER PUBLICATIONS

English Translation of CN204639977.*
(Continued)

*Primary Examiner* — Helen C Kwok
(74) *Attorney, Agent, or Firm* — O'Banion & Richtey LLP; John P. O'Banion

(57) ABSTRACT

A universal manufacturing vise jaw plate for use on a machine tool with a vise fixture, and configured for real-time operational data collection and analysis. The vise plate comprises a combination of acoustic and vibration sensors with a plate for cutting tool monitoring applications.

8 Claims, 4 Drawing Sheets

Related U.S. Application Data

(60) Provisional application No. 62/254,686, filed on Nov. 12, 2015.

(52) U.S. Cl.
CPC ...... *B23Q 17/0995* (2013.01); *B23Q 2703/02* (2013.01); *B23Q 2717/00* (2013.01)

(56) References Cited

U.S. PATENT DOCUMENTS

| | | | | | |
|---|---|---|---|---|---|
| 5,170,358 | A | * | 12/1992 | Delio | G05B 19/4163 173/2 |
| 5,197,018 | A | * | 3/1993 | Oh | G05B 19/4065 700/175 |
| 5,432,422 | A | * | 7/1995 | Nagano | G05B 19/404 318/611 |
| 5,907,491 | A | | 5/1999 | Canada | |
| 6,241,435 | B1 | * | 6/2001 | Huang | B23Q 5/225 318/575 |
| 7,160,066 | B2 | * | 1/2007 | Baker | B25B 5/14 269/142 |
| 7,540,697 | B2 | * | 6/2009 | Wang | B23Q 17/0976 409/141 |
| 7,647,853 | B2 | * | 1/2010 | Lundblad | B23B 27/002 408/143 |
| 8,157,252 | B2 | * | 4/2012 | Ladra | G05B 19/404 269/56 |
| 9,221,143 | B2 | * | 12/2015 | Inagaki | B23Q 17/0976 |
| 9,524,591 | B2 | * | 12/2016 | Coste | G07C 3/08 |
| 10,022,832 | B2 | * | 7/2018 | Piner | B23Q 17/0976 |
| 2004/0139803 | A1 | | 7/2004 | Robinson | |
| 2010/0145496 | A1 | * | 6/2010 | Tang | B23Q 17/00 700/174 |
| 2011/0144794 | A1 | | 6/2011 | Greenwald | |
| 2012/0151989 | A1 | * | 6/2012 | Knox | G01M 7/08 73/12.04 |
| 2013/0147633 | A1 | | 6/2013 | Sumrall | |
| 2014/0262392 | A1 | * | 9/2014 | Petrossians | G01M 1/22 173/20 |
| 2019/0061086 | A1 | * | 2/2019 | Bhinge | B23Q 17/098 |

FOREIGN PATENT DOCUMENTS

| | | |
|---|---|---|
| JP | 2002268742 A | 9/2002 |
| JP | 2012139766 | 7/2012 |
| KR | 1019950005451 A | 3/1995 |

OTHER PUBLICATIONS

Korean Intellectual Property Office (KIPO), International Search Report and Written Opinion dated May 10, 2017, related PCT international application No. PCT/US2017/019557, pp. 1-17, claims searched, pp. 18-22.

Korean Intellectual Property Office (KIPO), International Search Report and Written Opinion dated Jan. 26, 2017, related PCT international application No. PCT/US2016/059441, pp. 1-14, claims searched, pp. 15-18.

* cited by examiner

ACOUSTIC AND VIBRATION SENSING APPARATUS AND METHOD FOR MONITORING CUTTING TOOL OPERATION

CROSS-REFERENCE TO RELATED APPLICATIONS

This application is a 35 U.S.C. § 111(a) continuation of PCT international application number PCT/US2016/059441 filed on Oct. 28, 2016, incorporated herein by reference in its entirety, which claims priority to, and the benefit of, U.S. provisional patent application Ser. No. 62/254,686 filed on Nov. 12, 2015, incorporated herein by reference in its entirety. Priority is claimed to each of the foregoing applications.

The above-referenced PCT international application was published as PCT International Publication No. WO 2017/083120 on May 18, 2017, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Appendix A referenced herein is a computer program listing in a text file entitled "BK-2016-064-2-US-Appendix-A.txt" created on May 7, 2018 and having a 36 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This description pertains generally to machine tool operation, and more particularly to sensing for cutting tool operation.

2. Background Discussion

Generally, machine tools use vise fixtures on their beds to clamp a workpiece in place during the manufacturing process. A cutting tool is used in manufacturing operations such as drilling and milling to remove material from a workpiece at a certain material removal rate in order to create a feature. During the process of material removal, the cutting tool wears out. The condition of the cutting tool during the process of material removal depends on several factors, as well as random chance, and is impossible to know precisely a priori. Cutting with a worn cutting tool has adverse effects on the quality of the feature produced as well as the machine tool itself. For example, cutting with a worn cutting tool may result in cutting tool failures which lead to unexpected downtime, poor quality production, and stress on the machine tool.

Typically, cutting tools are replaced with a predefined set frequency in order to avoid cutting with a worn out tool. The cutting tool replacement frequency is generally based on prior knowledge of the cutting process and historical tool failures, and does not depend on the actual condition of the cutting tool. This leads to inefficiencies in cutting tool usage such that a cutting tool in a good condition is replaced prematurely, or a cutting tool in a bad condition is used for too long resulting in adverse effects described above.

It is currently difficult to monitor the current condition of the cutting tool in real-time to be able to diagnose the life of the cutting tool. Several attempts, especially involving the cutting tool or the tool holder, have been made at extracting data indicative of the condition of the cutting tool, but no data source with a common location across different machine tools has been developed to date.

BRIEF SUMMARY

The technology described herein is a universal manufacturing vise jaw plate for use on a machine tool with a vise fixture, and configured for real-time operational data collection and analysis. In one embodiment, the technology comprises a combination of acoustic and vibration sensors with the form factor of a universal manufacturing vise jaw plate for cutting tool monitoring applications. However, the technology is not restricted to machine tools alone, but can also be used in material handling equipment with universal vise jaws for real-time data collection. Beneficially, the technology will provide manufacturers with a source of real-time operational data that is indicative of the cutting tool condition when using machine tools with vise fixtures. The technology can be used in place of ordinary vise jaw plates, a design which is standardized across many machine tools.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
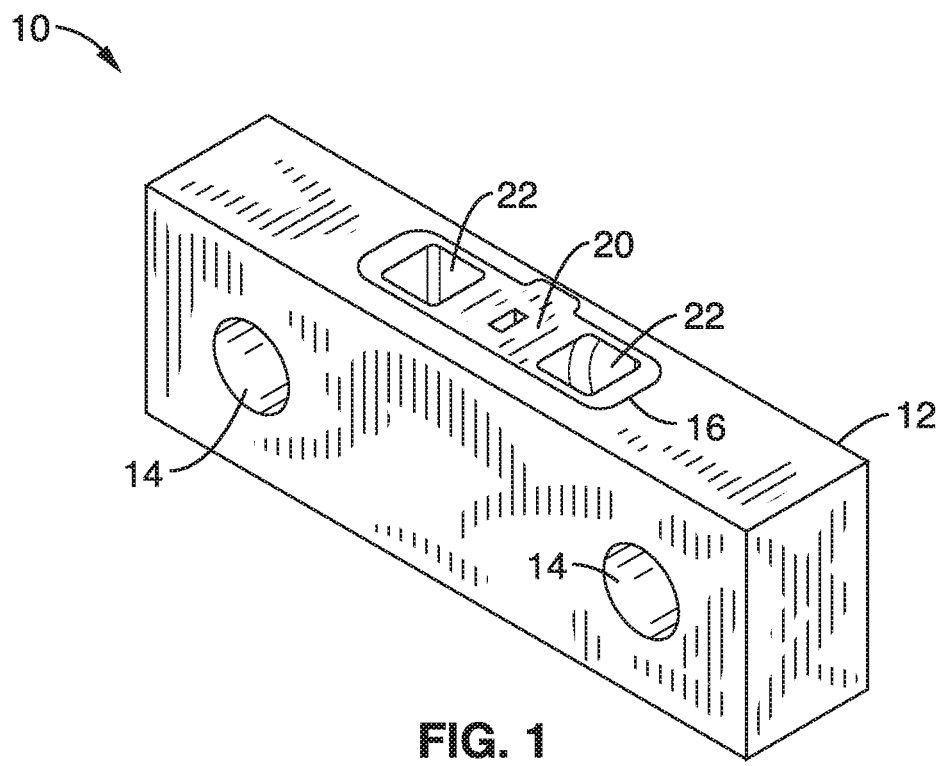
FIG. 1 shows a perspective view of a sensor housing and universal vise jaw plate assembly according to an embodiment of the technology described herein.

FIG. 1 shows a perspective view of a sensor housing and universal vise jaw plate assembly 10 according to an embodiment of the present technology. The universal vise jaw plate assembly 10 comprises a vise jaw plate 12 housing an acoustic and vibration sensing apparatus 20 for monitoring the operation of cutting tools while using a vise (not shown).

The vise jaw plate 12 is generally one of a pair of plates used for clamping and locking the position of a workpiece with respect to the cutting tool (not shown). The plate 12 comprises a pair of countersunk thru holes 14 for mounting the plate to one side of the vise (the second plate (not shown) is mounted on the opposing side of the clamp.) Universal vise jaw plates typically come in different sizes for different machine tools, the most frequently used being the 4",6", and 8" vise jaw plates. These vise jaw plates can be used with any vise from any vise manufacturer due to the standardized design. This ensures a common location of the sensors across different machine tools and vises and, hence, ensures a common data source and comparable data.

Figure 2:
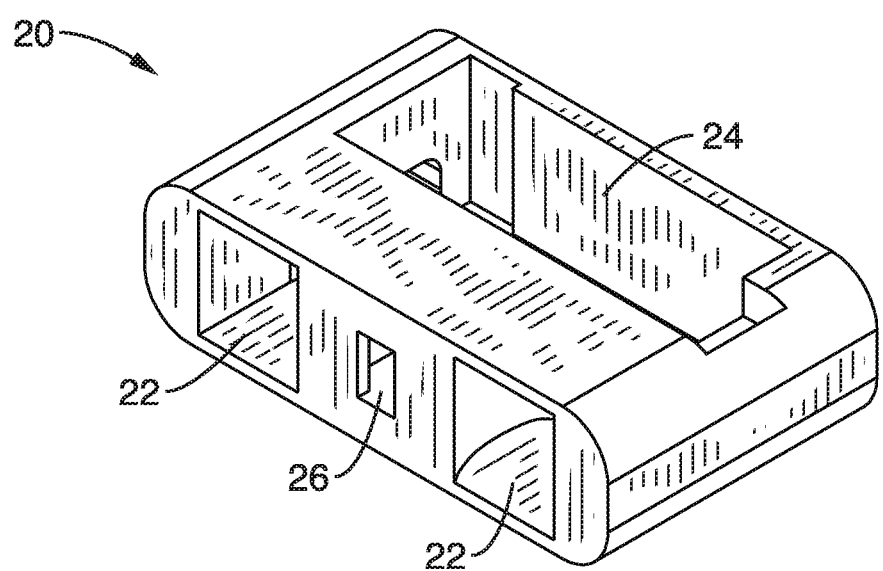
FIG. 2 is a perspective view of the sensor housing for fitting within the jaw plate assembly of FIG. 1.
Figure 3:
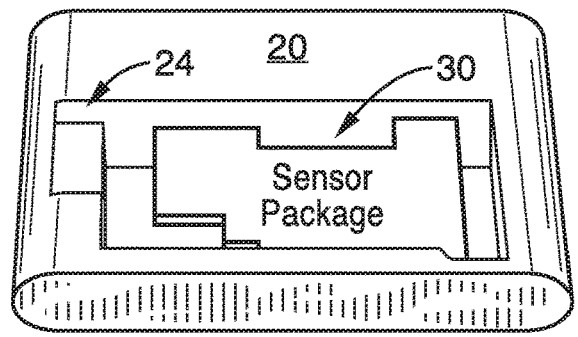
FIG. 3 is a perspective view of the sensor housing assembled with sensor electronics according to an embodiment of the technology described herein.

FIG. 1 illustrates a standard 6" vise jaw plate 12 that has been modified to include a hollowed-out pocket 16 according to an embodiment of the technology described herein. Fitted within the pocket 16 of the vise jaw plate 12 is a sensor housing 20, which is shown in greater detail in FIG. 2. The sensor housing 20 is preferably press-fit into the pocket of 16 the vise jaw plate 12. However, other fastening means are also contemplated. Finger pockets 22, 26 at the top of the sensor housing 20 allow for easy access and replacement of the sensor housing. Sensor housing 20 further comprises a lateral cavity 24 for housing the sensor electronics assembly or package 30, as shown in FIG. 3.

Figure 4:
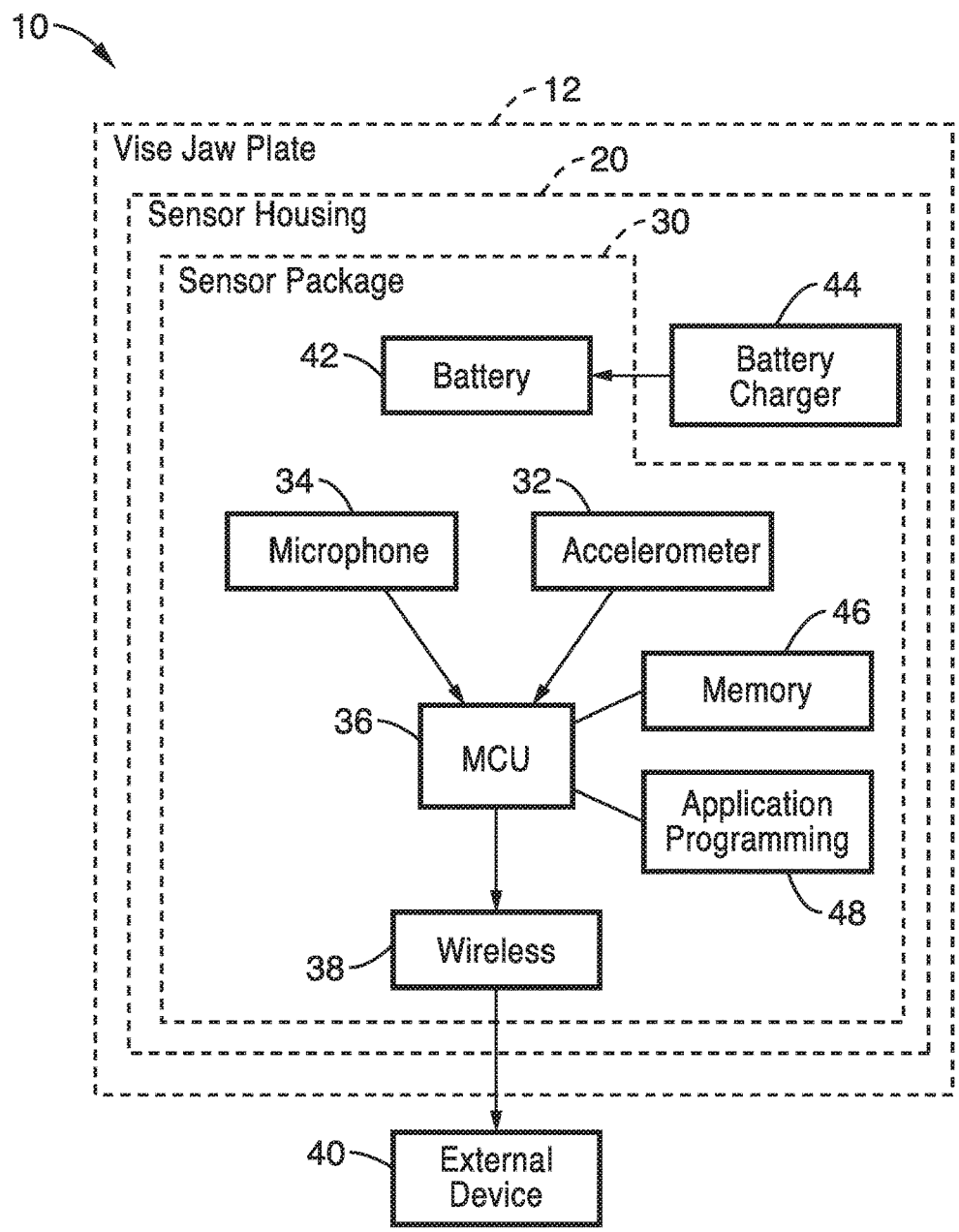
FIG. 4 shows a functional block diagram of the sensor electronics assembly of the jaw plate assembly according to an embodiment of the technology described herein.

FIG. 4 shows a functional block diagram of the sensor electronics assembly 30 of the jaw plate assembly 10. In one embodiment, the components used in the sensor assembly 30 comprise an accelerometer 32 for measuring vibration and a microphone 34 for acoustic sensing. Both sensors 32, 34 are coupled to a processor (e.g. MCU 36), which is configured to control operation of the sensors 32, 34, in addition to process data received from sensors 32, 34, via application programming 48. Application programming 48 comprises instructions stored in memory 46 and executable on processor 36. Processor 36 is also coupled to wireless transceiver 38 for communication with an external device 40. Sensor package 30 is powered via a battery 42, which may be recharged via charger 44.

In one exemplary embodiment, the accelerometer 32 comprises a Bosch BMX055 digital 9-axis accelerometer, microphone 34 comprises an InvenSense ICS-43432 low-noise microphone with I²S digital output, MCU 36 comprises a Teensy 3.2 microcontroller, wireless transceiver 38 comprises a CC2541 Bluetooth communication module, and battery 42 comprises a 3.7V 170 mAh LiPo battery. It is appreciated that the above embodiment is for illustrative purposes only, and other component configurations are also contemplated.

Figure 5:
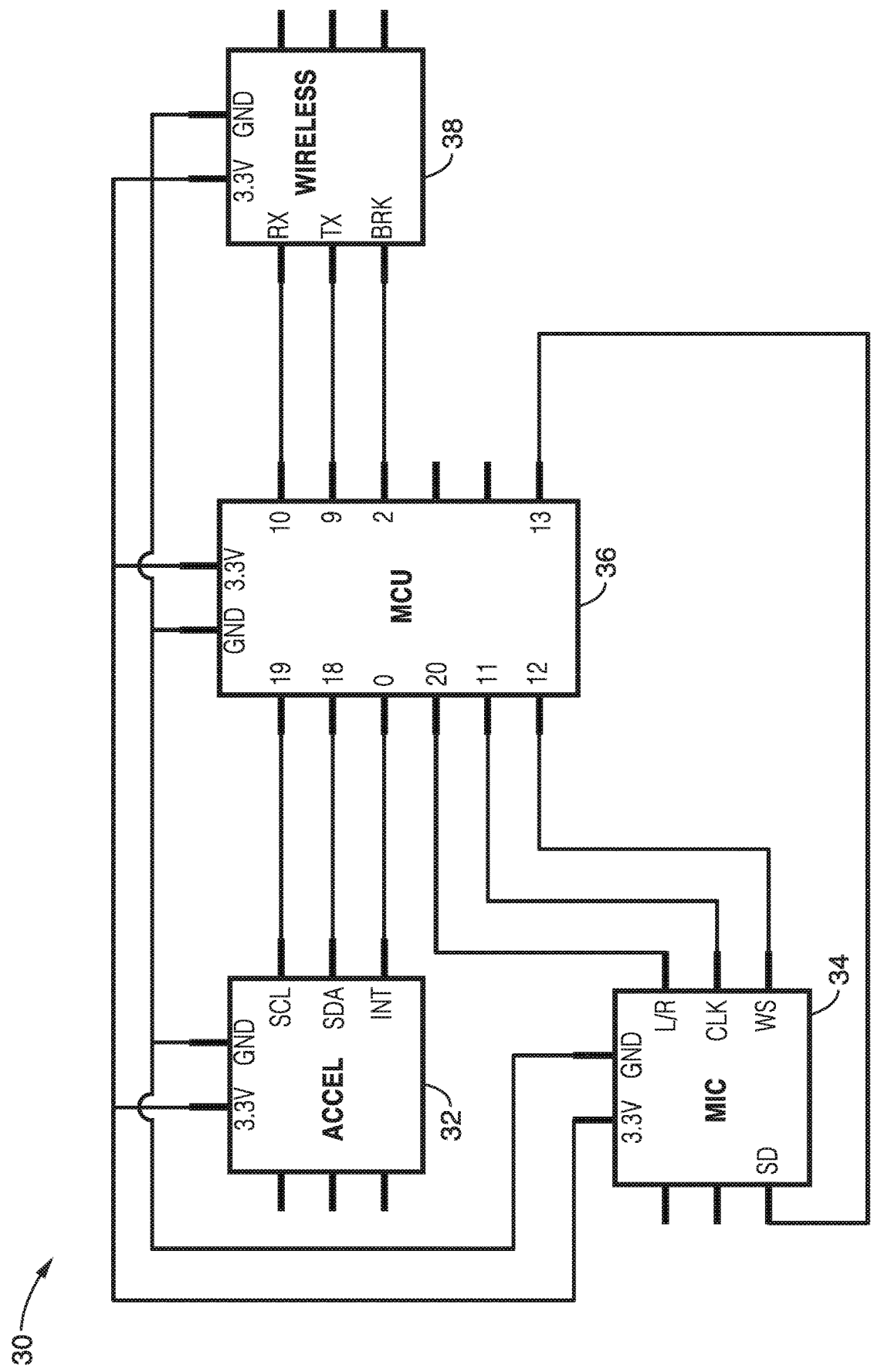
FIG. 5 is a schematic circuit diagram showing connections between certain components of the sensor electronics assembly shown in FIG. 4.

FIG. 5 is a schematic circuit diagram showing pinouts and connections between accelerometer 32, microphone 34, MCU 36 and wireless transceiver 38 electronics of the sensor package 30. It is appreciated that the connections are not restricted to those shown in FIG. 5, but different communication pins on the processor 36 (e.g. Teensy 3.2) can be used for the same results.

Figure 6:
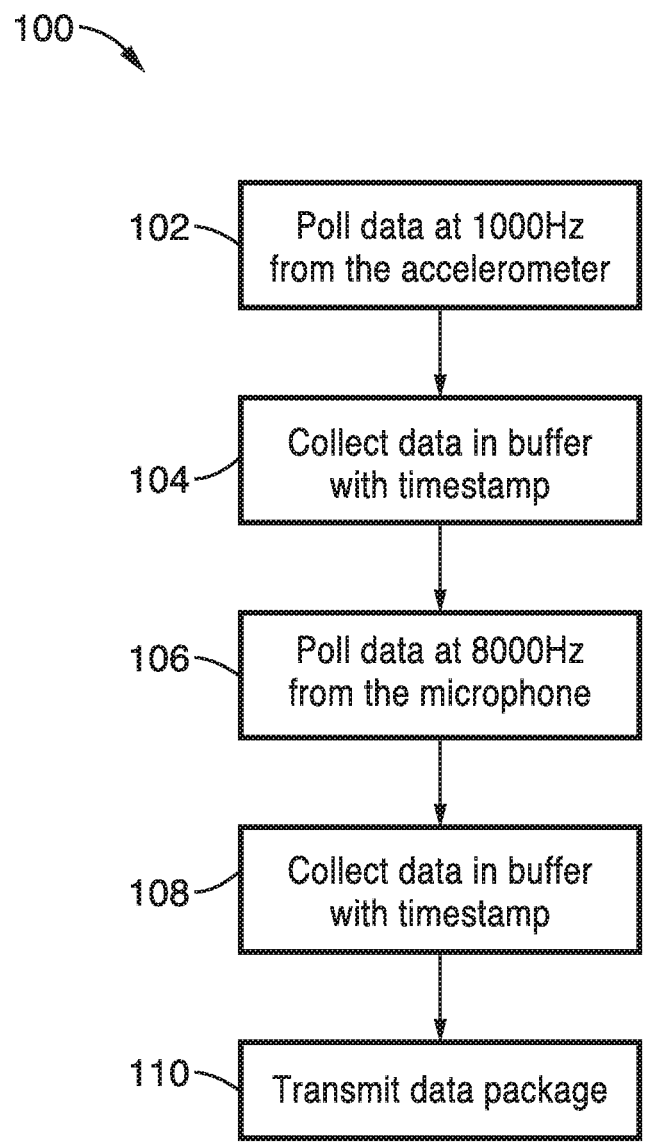
FIG. 6 is a flow diagram showing steps of data acquisition and processing according to an embodiment of the technology described herein.

Referring now to sensing method 100 shown in the process flow diagram of FIG. 6, one preferred sensing embodiment utilizes two streams of real-time data (e.g. vibration data and acoustic data) that are acquired from sensing circuitry 30. At step 102, the accelerometer 32 is sampled at a frequency of 1000 Hz to provide high resolution data of the vibrations of the workpiece due to the cutting forces. Data from the accelerometer is collected in a buffer with timestamps at step 104. At step 106, the acoustic sensor (e.g., microphone 34) is sampled at 8000 Hz to provide high frequency information of the cutting forces, as well as the instantaneous condition of the tool and cutting conditions. Data from the acoustic sensor is collected in a buffer with timestamps at step 108. At step 110, the two sources of data are combined together with their timestamps and sent wirelessly in a single data package through wireless data transceiver 38 to a data monitoring device 40 such as a computer, a process controller, and/or a visual display. In one embodiment, wireless communication is accomplished via a Bluetooth Low Energy (BLE) module.

While sensor electronics assembly 30 is primarily configured to acquire vibration data and acoustic data, it is appreciated that other forms of sensors, e.g. thermometers, pressure sensors, strain gauges, etc.) may also be implemented to acquire additional sensor data (e.g. temperature, pressure, strain, etc.).

In one embodiment, the accelerometer 32 communicates using the I²C protocol, whereas the microphone communicates using the I²S protocol. The wireless (Bluetooth) data communication is over serial data transfer. The output data may be further processed using via external device 40 via applications such as tool condition monitoring and process optimization. Appendix A provides an embodiment of instructions contained in application programming 48 the may be executable on a processor 36 (e.g. Teensy 3.2 microcontroller) to perform the functions shown in method 10 of FIG. 6.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that the terms "programming" or "program executable" as used herein refer to one or more instructions that can be executed by a processor to perform a function as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors. It will further be appreciated that as used herein, that the terms processor, computer processor, central processing unit (CPU), and computer are used synonymously to denote a device capable of executing the instructions and communicating with input/output interfaces and/or peripheral devices.

From the description herein, it will be appreciated that that the present disclosure encompasses multiple embodiments which include, but are not limited to, the following:

1. An apparatus for monitoring operation of a machine tool while machining a workpiece restrained by a vise, the apparatus comprising: (a) a universal vise jaw plate coupled to the vise and the workpiece; (b) a sensor assembly disposed within a cavity of the vise jaw plate; (c) the sensor assembly comprising: (i) a processor; (ii) an accelerometer coupled to the processor; (iii) an acoustic sensor coupled to the processor; (iv) a memory storing instructions executable by the processor; (v) wherein said instructions, when executed by the processor, perform steps of acquiring vibration data and acoustic data from the accelerometer and acoustic sensor to perform real-time monitoring of the machine tool.

2. The apparatus of any preceding embodiment, the sensor assembly further comprising: (vi) a wireless transceiver connected to the processor, the wireless transceiver configured for transmitting the acquired vibration data and acoustic data to an external device.

3. The apparatus of any preceding embodiment, further comprising: (d) a sensor housing fitted within the cavity of the vise jaw plate, the sensor housing configured for housing the sensor assembly.

4. The apparatus of any preceding embodiment, wherein said instructions when executed by the processor, further perform steps comprising: acquiring vibration data from the accelerometer and storing the data in a buffer with timestamps; acquiring acoustic data from the acoustic sensor and storing the data in a buffer with timestamps; and combining the collected vibration and acoustic data for real-time monitoring of the machine tool.

5. The apparatus of any preceding embodiment, wherein said instructions when executed by the processor, further perform steps comprising: wirelessly sending the combined data in a single data package to an external data monitoring device.

6. The apparatus of any preceding embodiment, wherein said real-time monitoring comprises determining a condition of the machine tool from the combined data.

7. The apparatus of any preceding embodiment, wherein the accelerometer is sampled at a frequency to provide high resolution data of the vibrations of the workpiece due to cutting forces applied with the machine tool.

8. The apparatus of any preceding embodiment, wherein the acoustic sensor is sampled at a frequency to provide high frequency data of the workpiece due to cutting forces applied with the machine tool.

9. A method for monitoring operation of a machine tool, the method comprising: coupling a universal vise jaw plate coupled to a vise and a workpiece; acquiring vibration data and acoustic data from a location within the vise jaw plate; and determining a condition of the machine tool as a function of the acquired accelerometer and acoustic data.

10. The method of any preceding embodiment, further comprising: wirelessly transmitting the acquired vibration data and acoustic data to an external device.

11. The method of any preceding embodiment, further comprising: acquiring vibration data from an accelerometer at the location within the vise base plate and storing the data in a buffer with timestamps; acquiring acoustic data from an acoustic sensor at the location within the vise base plate and storing the data in a buffer with timestamps; and combining the collected vibration and acoustic data for real-time monitoring of the machine tool condition.

12. The method of any preceding embodiment, further comprising: wirelessly sending the combined data in a single data package to an external a data monitoring device.

13. The method of any preceding embodiment, wherein acquiring vibration data comprises sampling the accelerometer at a frequency to provide high resolution data of the vibrations of the workpiece due to cutting forces applied with the machine tool.

14. The method of any preceding embodiment, wherein acquiring acoustic data comprises sampling the acoustic sensor at a frequency to provide high frequency data of the workpiece due to cutting forces applied with the machine tool.

15. An apparatus for monitoring operation of a machine tool while machining a workpiece restrained by a vise and a universal vise jaw plate coupled to the vise and workpiece, the apparatus comprising: (a) a processor; and (b) a memory storing instructions executable by the processor; (c) wherein said instructions, when executed by the processor, perform steps comprising: (i) acquiring vibration data and acoustic data from a location within the vise jaw plate; and (ii)

determining a condition of the machine tool as a function of the acquired accelerometer and acoustic data.

16. The apparatus of any preceding embodiment, wherein said instructions, when executed by the processor, further perform steps comprising: (iii) wirelessly transmitting the acquired vibration data and acoustic data to an external device.

17. The apparatus of any preceding embodiment, wherein determining a condition of the machine tool comprises: acquiring vibration data from an accelerometer at the location within the vise base plate and storing the data in a buffer with timestamps; acquiring acoustic data from an acoustic sensor at the location within the vise base plate and storing the data in a buffer with timestamps; and combining the collected vibration and acoustic data for real-time monitoring of the machine tool condition.

18. The apparatus of any preceding embodiment, said instructions configured to perform steps further comprising: wirelessly sending the combined data in a single data package to an external a data monitoring device.

19. The apparatus of any preceding embodiment, wherein acquiring vibration data comprises sampling the accelerometer at a frequency to provide high resolution data of the vibrations of the workpiece due to cutting forces applied with the machine tool.

20. The apparatus of any preceding embodiment, wherein acquiring acoustic data comprises sampling the acoustic sensor at a frequency to provide high frequency data of the workpiece due to cutting forces applied with the machine tool.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A universal vise jaw plate apparatus for a machine tool in determining machine tool condition, the apparatus comprising:
    (a) a vise jaw plate of a vise jaw plate assembly configured for mounting to a vise that is configured for retaining a workpiece during machining;
    (b) a hollow pocket in said vise jaw plate assembly;
    (c) a sensor housing disposed within the hollow pocket of the vise jaw plate which is configured for easy access and replacement from said vise jaw plate assembly;
    (d) a sensor assembly disposed within said sensor housing;
    (e) the sensor assembly comprising:
        (i) a processor;
        (ii) an accelerometer coupled to the processor;
        (iii) an acoustic sensor coupled to the processor;
        (iv) a wireless transceiver connected to the processor;
        (v) a memory storing instructions executable by the processor;
        (vi) wherein said instructions, when executed by the processor, perform steps comprising:
            (A) acquiring vibration data from the accelerometer in a first stream at a first sampling rate which is collected in a buffer with timestamps;
            (B) acquiring acoustic data from the acoustic sensor in a second stream at a second sampling rate which is collected in a buffer with timestamps; and
            (C) combining said vibration data and said acoustic data with timestamps for said vibration data and said acoustic data into combined vibration and acoustic data;
            (D) wirelessly communicating the combined vibration and acoustic data in a single data package to an external data monitoring device for real-time monitoring of the machine tool for determining a condition of the machine tool from the combined vibration and acoustic data which indicates cutting tool condition when using machine tools with universal vise jaw plate fixtures.

2. The apparatus of claim 1, wherein said vise jaw plate is configured in different sizes for different machine tools for use on vises from any vise manufacturer using the standardized format of the universal vise jaw which ensures a common location of the sensor assembly across different machine tools and vises towards ensuring a common data source and comparable data.

3. The apparatus of claim 2, wherein said vise jaw plate is selected from a group of jaw plate lengths consisting of 4 inch, 6 inch, and 8 inch jaw plates.

4. The apparatus of claim 1, wherein said sensor housing is configured for being press fit into said hollow pocket of said vise jaw plate, with said sensor housing having a top surface configured with finger pockets on its top for providing access and replacement of the sensor housing with its sensor assembly.

5. The apparatus of claim 1, wherein said vise jaw plate is configured with a pair of through holes for mounting said jaw plate to a first side of a vise jaw.

6. The apparatus of claim 1, wherein said real-time monitoring comprises determining a condition of the machine tool from the combined vibration and acoustic data.

7. The apparatus of claim 1, wherein the accelerometer is sampled at a frequency to provide high resolution vibration data of the workpiece due to cutting forces applied with the machine tool.

8. The apparatus of claim 1, wherein the acoustic sensor is sampled at a frequency to provide high frequency data of the workpiece due to cutting forces applied with the machine tool.

* * * * *